US011797003B2

(12) United States Patent
Sonalker et al.

(10) Patent No.: US 11,797,003 B2
(45) Date of Patent: Oct. 24, 2023

(54) SYSTEM AND METHOD FOR AUTONOMOUS VEHICLES TO PERFORM AUTONOMOUS TRIPS

(71) Applicant: STEER TECH LLC, Annapolis Junction, MD (US)

(72) Inventors: Anuja Sonalker, Annapolis Junction, MD (US); Bohan Wang, Annapolis Junction, MD (US)

(73) Assignee: STEER TECH, LLC, Annapolis Junction, MD (US)

( * ) Notice: Subject to any disclaimer, the term of this patent is extended or adjusted under 35 U.S.C. 154(b) by 416 days.

(21) Appl. No.: 16/242,102

(22) Filed: Jan. 8, 2019

(65) Prior Publication Data

US 2019/0212737 A1 Jul. 11, 2019

Related U.S. Application Data

(60) Provisional application No. 62/614,847, filed on Jan. 8, 2018.

(51) Int. Cl.
*G05D 1/00* (2006.01)
*G06Q 50/30* (2012.01)
*G06V 20/58* (2022.01)

(52) U.S. Cl.
CPC .......... *G05D 1/0088* (2013.01); *G06Q 50/30* (2013.01); *G06V 20/586* (2022.01); *G05D 2201/0213* (2013.01)

(58) Field of Classification Search
CPC ......... G05D 1/0088; G05D 2201/0213; G06Q 50/30; G06V 20/586; B62D 15/0285
See application file for complete search history.

(56) References Cited

U.S. PATENT DOCUMENTS

| 2016/0116293 | A1* | 4/2016 | Grover | G01C 21/34 |
| | | | | 701/23 |
| 2016/0131494 | A1* | 5/2016 | Lee | H04W 24/04 |
| | | | | 701/25 |
| 2017/0359314 | A1* | 12/2017 | Mathias | H04L 63/0428 |
| 2018/0189716 | A1* | 7/2018 | Crone | G06Q 10/083 |
| 2018/0275661 | A1* | 9/2018 | Glaser | G01C 21/3423 |
| 2019/0064809 | A1* | 2/2019 | Salter | G05D 1/028 |
| 2019/0163204 | A1* | 5/2019 | Bai | G05D 1/0278 |
| 2019/0193724 | A1* | 6/2019 | Kim | G08G 1/143 |

OTHER PUBLICATIONS

Jin Cui et al. "On the Alignment of safety and security for autonomous vehicles" IARIA (Year: 2017).*

* cited by examiner

*Primary Examiner* — Rachid Bendidi
(74) *Attorney, Agent, or Firm* — CALDWELL INTELLECTUAL PROPERTY LAW

(57) ABSTRACT

A system and method for an autonomous vehicle to perform an autonomous trip. A mobile communication device establishes a connection with an autonomous vehicle. The mobile communication device transmits a request for the autonomous vehicle to perform an autonomous trip. The autonomous trip includes the autonomous vehicle traveling from a first location to a second location without operator input. The autonomous trip is to be initiated by the autonomous vehicle based on the reception of the request.

17 Claims, 11 Drawing Sheets

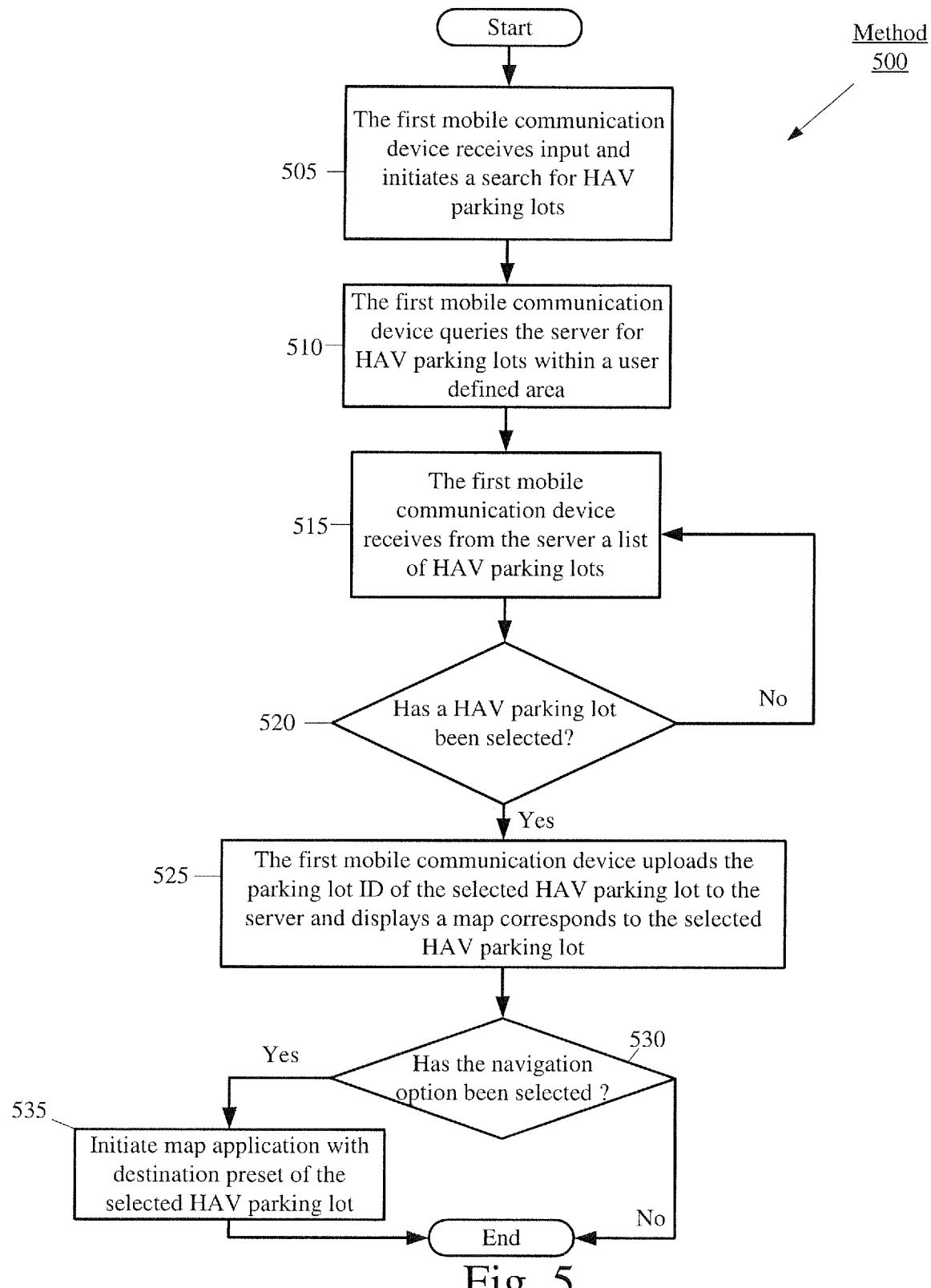

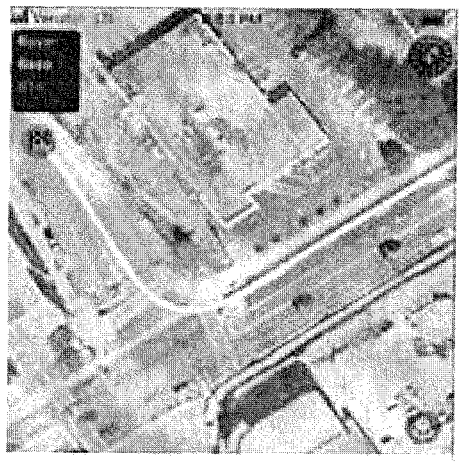
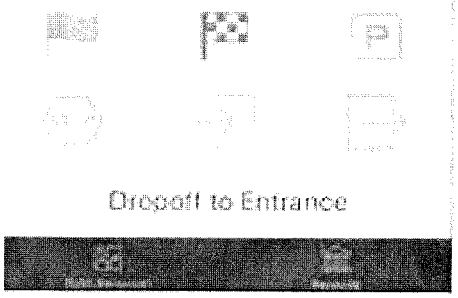
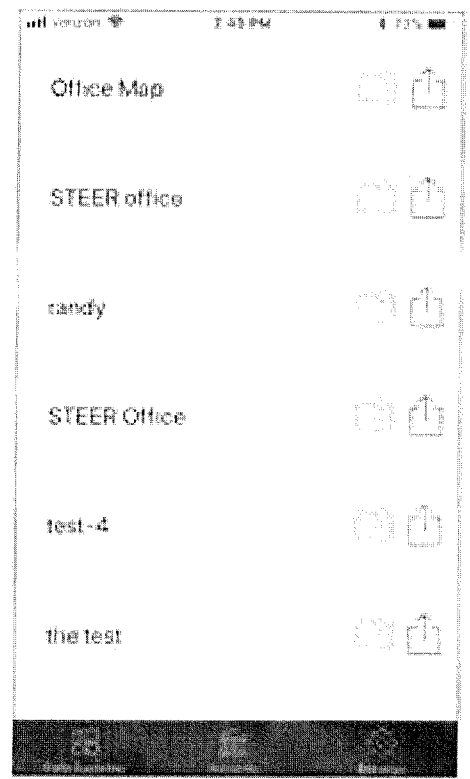
Fig. 9a
Fig. 9b

SYSTEM AND METHOD FOR AUTONOMOUS VEHICLES TO PERFORM AUTONOMOUS TRIPS

BACKGROUND INFORMATION

The society of Automotive Engineers (SAE) has defined six different levels (0-5) to categorize the type of automation a vehicle may be configured to perform. Levels 0-3 all require a driver and cannot travel from a first point to a second point without any human interaction during the trip. Level 4 vehicles are configured to perform all safety-critical driving functions and monitor roadway conditions for an entire trip between a first point and a second point without any human interaction during the trip. However, level 4 vehicles are limited according to their corresponding operational design domain (ODD). Level 5 vehicles may perform all driving tasks under any conditions. The SAE levels for automated vehicles have been adopted by various entities including the National Highway Traffic Safety Administration.

The ODD may vary for each level 4 vehicle. The ODD may describe the specific operating conditions in which the automated vehicle is intended to operate. The ODD may include, but is not limited to, roadway types the vehicle is intended to operate on, geographic areas the vehicle is intended to operate within, vehicle state conditions the vehicle is intended to satisfy to operate autonomously, environmental conditions the vehicle is intended to operate within, etc.

When a level 4 vehicle encounters conditions that are outside of the ODD during autonomous operations the vehicle should trigger Minimal Risk Condition (MRC). The MRC may vary depending on the situation. For example, the MRC may trigger the vehicle to automatically stop in a safe manner outside an active lane of traffic.

SUMMARY

According to an exemplary embodiment, a method may be performed at a mobile communication device. The method includes the mobile communication device establishing a connection with an autonomous vehicle. The method further includes transmitting a request for the autonomous vehicle to perform a first autonomous trip. The first autonomous trip includes the autonomous vehicle traveling from a first location to a second location without operator input. The first autonomous trip is to be initiated by the autonomous vehicle based on the reception of the request.

According to another exemplary embodiment, a method may be performed at a processor of an autonomous vehicle. The method includes establishing a connection with a mobile communication device. The method further includes, receiving a request for the autonomous vehicle to perform a first autonomous trip. The first autonomous trip includes the autonomous vehicle traveling from a first location to a second location without operator input. The method further includes initiating the first autonomous trip based on the request.

According to a further exemplary embodiment, a processor is configured to establish a connection with a mobile communication device. The processor is further configured to receive a request for an autonomous vehicle to perform a first autonomous trip. The first autonomous trip includes the autonomous vehicle traveling from a first location to a second location without operator input. The processor is further configured to initiate the first autonomous trip based on the request.

BRIEF DESCRIPTION OF THE DRAWINGS

FIG. 5 shows an exemplary method 500 for executing a search for HAV parking lots corresponding to provisioned points of interest within a user defined area according to exemplary embodiments described herein.

FIG. 9a-9b show an exemplary display provided to the user via the second mobile communication device during the execution of the method 900 according to exemplary embodiments described herein.

DETAILED DESCRIPTION

Figure 1:
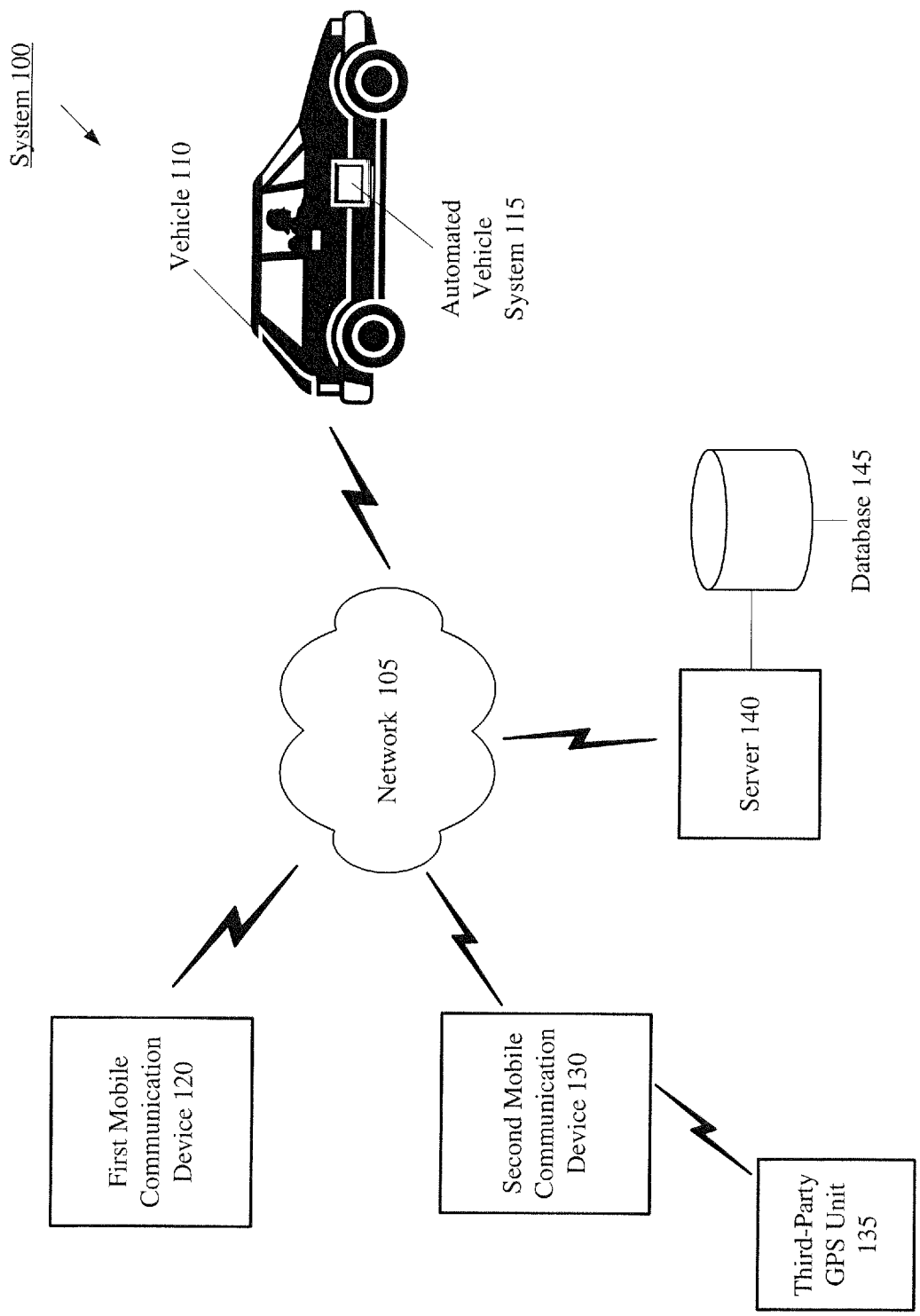
FIG. 1 shows an exemplary system according to various exemplary embodiments described herein.

The exemplary embodiments may be further understood with reference to the following description and the related appended drawings, wherein like elements are provided with the same reference numerals. The exemplary embodiments are related to systems and methods for autonomous vehicle operation between a first location and a second location without any human interaction. For example, a vehicle and a driver may arrive at a designated drop off location corresponding to an airport. At the drop off location, the driver steps out of the vehicle and subsequently, the vehicle parks itself. The system and the corresponding methods enables the vehicle to autonomously navigate to a corresponding parking lot, search for an available spot and park itself. When the driver is ready to drive the vehicle again, the driver may summon their vehicle to autonomously navigate to a pick up location.

Initially, it is noted that the exemplary embodiments are described with regard to a SAE level 4 autonomous vehicle. However, the use a level four autonomous vehicle is merely for illustrative purposes. The exemplary embodiments may utilize any type of autonomous vehicle that is capable of traveling from a first location to a second location without any human interaction. Operations performed without any human interaction may include, but are not limited to, performing safety critical driving functions, navigating from a first location to a second location (e.g. maneuvering lanes, monitoring roadway conditions, etc.), identifying vacant parking spots, maneuvering into vacant parking spots, etc.

Further, it is to be noted that the exemplary embodiments are described with regard to points of interest. However, reference to a point of interest is merely for illustrative purposes. The exemplary embodiments may utilize any location as a point of interest once it is provisioned into the system. Once provisioned, the particulars of the point of interest, including but not limited to, designated drop off locations, designated pick up locations and parking lots are maintained by the system.

Autonomous vehicle operation may be based on an Operational Design Domain (ODD). The ODD may describe the specific operating conditions in which the automated vehicle is intended to operate. The systems and methods of the exemplary embodiments described herein may define an ODD. However, an ODD may vary from vehicle to vehicle based on a variety of factors including, but not limited to, the vehicle type, the vehicle manufacturer, the automated system manufacturer, the vehicles intended purpose, etc. The exemplary embodiments described herein may apply variety of different ODDs.

FIG. 1 shows an exemplary system 100 according to the exemplary embodiments. The system 100 may include a vehicle 110 equipped with an automated vehicle system 115 and capable of communicating with the network 105. The vehicle 110 may be any type of vehicle capable of autonomous operation that may be configured to travel between a first location and a second location without any human interaction during the duration of the trip. The automated vehicle system 115 may control some or all of the operations of the vehicle 110. For example, the vehicle 110 may be configured to perform operations that may categorize the vehicle 110 as a level 4 autonomous vehicle according to the Society of Automotive Engineers' (SAE) levels for automated driving systems. A person having ordinary skill in the art would understand that an SAE level 4 autonomous vehicle may perform all safety critical driving functions and monitor roadway conditions for the duration of a trip between a first location and a second location. It should also be understood that reference to SAE level 4 is merely provided for illustrative purposes and the exemplary embodiments may apply to any type of autonomous vehicle that is capable of traveling between a first location and a second location without any human interaction during the trip. It should be further understood that an actual system may include any number of vehicles capable of autonomous operation and the example of a single vehicle 110 is merely provided for illustrative purposes.

The system 100 may also include a first mobile communication device 120. The first mobile communication device 120 may be configured to communicate with the network 105, request the vehicle 110 to provide various types of information and request the vehicle 110 to perform various operations. Those skilled in the art will understand that the first mobile communication device 120 may be any type of electronic component that is configured to communicate via a network, e.g. mobile phones, tablet computers, desktop computers, smartphones, phablets, embedded devices, wearables, Internet of Things (IoT) devices, etc.

The system 100 may also include a second mobile communication device 130. The second mobile communication device 130 may be configured to communicate with the network 105, communicate with a third-party Global Positioning System (GPS) unit 135 and provide provisioning information corresponding to a point of interest. A point of interest may represent a geographical area with defined boundaries and may include, but is not limited to, designated drop off locations, designated pick up locations, parking spots and parking lots. An example of a point of interest may be a shopping mall, a train station, an airport, a campus, a restaurant, a consumer retail store or any other geographic area where a driver may want to exit their vehicle at first location and autonomously park their vehicle at a second location. Those skilled in the art will understand that the second mobile communication device 130 may be any type of electronic component that is configured to communicate via a network, e.g. mobile phones, tablet computers, desktop computers, smartphones, phablets, embedded devices, wearables, IoT devices, etc.

It should be noted that reference to a single first mobile communication device 120 and a single second mobile communication device 130 is merely for illustrative purposes. The system 100 may include any number of devices that perform the operations of the first mobile communication device 120 and any number of devices that perform the operations of the second mobile communication device 130. Further, a single device may be capable of performing the operations of the first mobile communication device 120 and the operations of the second mobile communication device 130. Thus, the example of a single first mobile communication device 120 and a single second mobile communication device 130 is merely provided for illustrative purposes and an actual system may include any number of mobile communication devices.

The system 100 may further include a server 140 and a database 145. The server 140 may be in communication with the other components of the system 100, e.g. the first mobile communication device 120, the vehicle 110, the second mobile communication device 130 and the database 145 via the communication network 105 or any other suitable connection. The server 140 may be configured to process various requests received from the other components of the system 100. The database 145 may store various information provided to the server 140. For example, the database 145 may include positioning information that corresponds to particular points of interest. It should be noted that reference to a single server 140 and a single database 145 is merely for illustrative purposes. The exemplary embodiments may apply to any number of servers and any number of databases.

The network 105 may be any type of network that provides wireless communication. For example, the network 105 may be a LTE radio access network (LTE), a 5 G New Radio access network (5G), a legacy cellular network, a wireless local access network (WLAN), the Internet etc. As mentioned above, the first mobile communication device 120, the second mobile communication device 130, the server 140, the database 145 and the automated vehicle system 115 of the vehicle 110 may be capable of communicating with the network 105. Thus, the components of the system 100 may communicate with one another via the network 105. However, it should be understood that reference to the network 105 operating as a single network, containing particular components or operating according to a certain protocol is merely provided for illustrative purposes and the exemplary embodiments may apply to a plurality of connected networks, wired connections, peer-to-peer communication, a VPN tunnel, a direct connection, a combination thereof, or any other suitable connection that facilitates communication among the first mobile communication device 120, the second mobile communication device 130, the server 140, the database 145 and the automated vehicle system 115 of the vehicle 110. Thus, the components of the system 100 may communicate via a variety of different frequencies and a variety of different channels.

It should also be noted that the components of the system 100 do not need to be continuously connected to the network 105 nor do the components of the system 100 need to be connected to the network 105 at the same time. For example, at a first time, the second mobile communication device 130, the server 140 and the database 145 may be the only components connected to the network 105. While connected, the second mobile communication device 130 may provide provisioning information corresponding to a point of interest to the server 140 and the server 140 may store the corresponding provisioning information in the database 145. Subsequently, the second mobile communication device 130 may power off and disconnect from the network 105. At a second time, the first mobile communication device 120, the server 140, the database 145 and the automated vehicle system 115 of the vehicle 110 may be the only components of the system 100 connected to the network 105. While connected, the first mobile communication device 120 and the automated vehicle system 115 of the vehicle 110 may communicate via the server 140 regarding the provisioning information corresponding to the point of interest provided by the second mobile communication device 130 at the first time.

As mentioned above, autonomous operations may require an ODD. Accordingly, the components of the system 100 may at various times ensure that the vehicle 110 is within the ODD when performing autonomous operations. For example, the first communication device 120 may not permit a user to submit a request for the vehicle 110 to perform autonomous operations unless a set of minimum predefined conditions are met. Once autonomous operations begin, the vehicle 110 may attempt to maintain its trajectory towards its intended end point location. However, if at any time the automated vehicle system 115 of the vehicle 110 detects obstacles, objects, pedestrians, loss of connectivity or external signals the automated vehicle system 115 may initiate sequences for risk mitigation. Risk mitigation may include, but is not limited to, obstacle avoidance, reducing speed and coming to a full stop.

Figure 2:
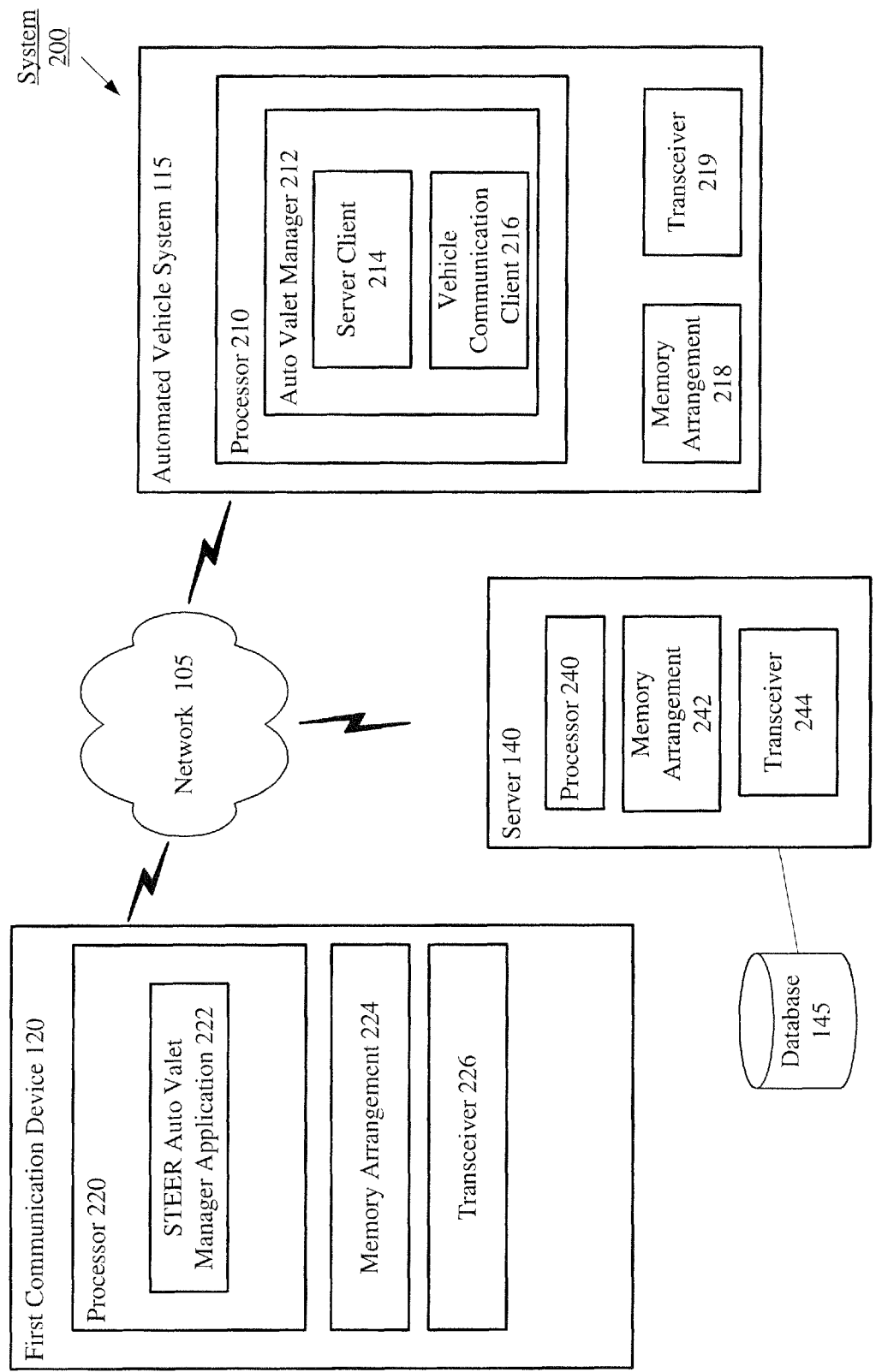
FIG. 2 shows an exemplary system where a first mobile communication device may be configured to request various autonomous operations of a vehicle according to various exemplary embodiments described herein.

FIG. 2 shows an exemplary system 200 where the first mobile communication device 120 may be configured to request various autonomous operations of the vehicle 110 according to various exemplary embodiments described herein. For example, according to one exemplary embodiment the first mobile communication device 120 may receive input that indicates that a user would like the vehicle 110 to autonomously navigate from a first location (e.g. a designated drop location) to a second location (e.g. a parking lot) and park in an available parking spot. In another exemplary embodiment, the first mobile communication device 120 may receive input indicating that a user would like to summon the vehicle 110 to autonomously navigate from a first location (e.g. a parking spot) to a second location (e.g. a designated pick up location). The system 200 includes the first mobile communication device 120, the server 140, the database 145, and the automated vehicle system 115 of the vehicle 110. The components of the system 200 communicate via the network 105. As mentioned above, the network 105 may include any number of suitable connections that facilitate communication among the first mobile communication device 120, the server 140, the database 145 and the automated vehicle system 115 of the vehicle 110.

It should be noted that the system 200 may communicate via an event driven model. That is, the first mobile communication device 120, the server 140, the database 145, and the automated vehicle system 115 of the vehicle 110 may be configured to listen for a certain set of events. In response to a detecting an event from the corresponding set of events, the component may perform a predefined action locally and then subsequently, the component that performed the action may emit a further event. It should be noted that performing an action locally and emitting a further event are not required for a component to communicate via the event driven model.

The automated vehicle system 115 of the vehicle 110 may include a processor 210, a memory arrangement 218 and a transceiver 219. Further, the automated vehicle system 115 may include further components (not shown) such as a vehicle control center, vehicle communication server, a display device, an input/output device and other components such as portable power supply, an audio I/O device, etc. It should be noted that the processor 210, the memory arrangement 218, the transceiver 219 and the further components may be exclusive to the automated vehicle system 115 or may be shared among a plurality of systems included in the vehicle 110.

The processor 210 may be configured to perform various operations including, but not limited to, executing the Auto Valet Manager 212. The Auto Valet Manager 212 may be a software application that may be included as part of middleware provided by the vehicle manufacturer or may be included as part of middleware installed as an aftermarket addition to the In-vehicle platform. Specifically, the Auto Valet Manager 212 may perform various operations related for the automated vehicle system 115. For example, the Auto Valet Manager 212 may communicate with the server 140, perform various security validations and implement the communication protocol specific to the vehicle's 110 control center. The vehicle's 110 control center may control the autonomous operations of the vehicle 110 (e.g. safety critical driving functions and monitoring roadway conditions for the duration of a trip between a first point and a second point.) It should be noted that exemplary embodiments are described as being performed by the processor 210 and the Auto Valet Manager 212. However, other components may perform some or all of the functionalities described herein.

The middleware may manage various operations of the automated vehicle system 115 for the vehicle 110. The middleware may manage operation of various sensors of the vehicle 110, execution of processing agents or managers of the automated vehicle system 115, communications with a real-time communication network, operation of actuating controllers on the vehicle 110, execution of feedback mechanisms and various algorithms. For example, the middleware may receive information from various sensors of the vehicle 110 (e.g. GPS, inertial measurement unit (IMU), radar, camera, ultrasonics, mapping, wheel displacement, vehicle speed, etc.) to create a perception model for the vehicle 110. The perception model may be a representation of the environment around the vehicle 110 and the location of the vehicle 110 in that environment. The middleware may create a mission plan for the vehicle 110 in response to a command. The mission plan may include a mission goal (e.g. park in a parking space) and the steps the vehicle 110 may perform to achieve the mission goal. The middleware may also control the execution of the mission goal. That is, the middleware may be responsible for calculating a viable path from a first location to a second location and ensuring the vehicle 110 follows the viable path via actuating the controls of the vehicle (e.g. controlling a combination of acceleration, speed, brakes, steering wheel, transmission, gears etc.). The middleware may also control the obstacle avoidance and recalculation procedures on route to the mission goal. This may include, maintaining the perception model and making determinations based on the perception model. For example, this may include performing operations for encountering a traffic jam, crossing an intersection, encountering pedestrians etc. Thus, the middleware may attempt to maintain its course but will deviate from the course then recalculate and return to the mission. The middleware may also manage operations related to identifying and maneuvering the vehicle 110 into available parking spaces within a parking lot.

A person having ordinary skill in the art would understand that the processor 210, the memory arrangement 218 and the transceiver 219 may be, for example, general purpose processors, a digital signal processor, an application specific integrated circuit (ASIAC), any other type of integrated circuit and these processor and integrated circuits may execute software programs or firmware that perform functionality similar to the embodiments of the automated vehicle system 115 described herein. In some exemplary embodiments, the processor 210 may include multiple processors such as an application processor and a baseband processor.

The Auto Valet Manager 212 may control various operations for the automated vehicle system 115. The Auto Valet Manager 212 is comprised of two sub classes, a server client 214 and a vehicle communication client 216. The Auto Valet Manager 212 may utilize the server client 214 and the vehicle communication client 216 to perform various functions of the automated vehicle system 115. For example, the Auto Valet Manager 212 may utilize these clients to process events (or requests or any other type of information) received from the server 140, monitor and deliver vehicle 110 specific information to the vehicle control center and request autonomous operations be performed by the vehicle 110.

The server client 214 may establish a connection with the server 140 via the network 105. Once the connection with the server 140 is established, the server client 214 may listen for a particular set of events that may be received via the connection with the server 140. The set of events may include, but are not limited to, a request for vehicle state information corresponding to the vehicle 110, a request for the location of the vehicle 110, a selected parking lot or point of interest, a request for autonomous parking to be performed by the vehicle 110 and a request for autonomous summoning to be performed by the vehicle 110. Subsequently, in one exemplary embodiment, a corresponding callback function may be invoked by the server client 214 based on the received events. The callback function may enable the Auto Valet manager 212 to process the received event and execute the received event. However, it should be noted that reference to a callback function is merely provided for illustrative purposes and different programming languages may refer to similar functions in a variety of different ways. It should further be noted that the exemplary embodiments may process a received event without utilizing a callback function or any similar function.

The vehicle communication client 216 may implement the communication protocol specific to the vehicle's 110 command and communication channel. Accordingly, the vehicle communication client 216 may provide the callback functions invoked by the server client 214 to the vehicle control center where autonomous operations may be controlled. In other words, the vehicle communication client 216 may translate the events received by the server client 214 into commands that may be performed by automated vehicle system 115 or further components of the vehicle 110.

The first mobile communication device 120 may include a processor 220, a memory arrangement 224 and a transceiver 226. Further, the first mobile communication device 120 may include further components (not shown) such as a display device, an input/output device and other components such as portable power supply, an audio I/O device, etc.

The processor 220 may be configured to execute a plurality of applications of the first mobile communication device 120. For instance, the first mobile communication device 120 may execute the STEER Auto Valet Manager Application 222. The STEER Auto Valet Manager Application 222 may perform various functions, such as, searching for highly automated vehicle (HAV) parking lots and generating for display the results of the search which may include the location of a HAV parking lot and directions from the current location of the first mobile communication device 120 to the HAV parking lot. It should be noted that an HAV parking lot may be associated with a point of interest. For instance, a point of interest may include a single HAV parking lot or multiple HAV parking lots. The STEER Auto Valet Manager Application 222 may also generate an event that requests the vehicle 110 to autonomously navigate from its current location (e.g. a designated drop off location or a parking space) to another particular location (e.g. a designated pick up location or a parking space). It should be noted that reference to the STEER Auto Valet Manager Application 222 is merely provided for illustrative purposes. Other systems may apply a different name to an application that performs the same functionality. Alternatively, the functionality of STEER Auto Valet Manager Application 222 may be distributed among a plurality of applications.

The STEER Auto Valet Manager Application 222 may also control the operations of a GPS data manager for the first mobile communication device 120. The GPS data manager may control the internal GPS location service of the first mobile communication device 120. The GPS data manager may perform functions including, but not limited to, requesting a user to grant "always use GPS" authorization to the STEER Auto Valet Manager Application 222, updating GPS coordinates of the first mobile communication device 120 and geo-fence monitoring. A geo-fence may be a virtual geographic boundary defined by GPS coordinates that enable software to trigger a response when a mobile communication device enters or leaves the defined geographic boundary. In one exemplary embodiment, the STEER Auto Valet Manager Application 222 may be enable or disable various operations of the system 200 based on geo-fence boundaries.

The STEER Auto Valet Manager Application 222 may also control the operations of a server manager for the first mobile communication device 120. The server manager may handle the communication between the server 140 and the first mobile communication device 120. Communication between the first mobile communication device 120 and the server 140 may be performed in accordance with Socket.IO protocols. Thus, the server manager may be responsible for providing various types of data that may be required for the first mobile communication device 120 to utilize the Socket.IO protocols. Further, the server manager may also control various operations for the first mobile communication device 120 including, but not limited to, establishing a connection between the first mobile communication device 120 and the server 140, terminating a connection between the first mobile communication device 120 and the server 140, querying vehicle state information, querying vehicle location information, uploading a HAV parking lot selected by the user of the first mobile communication device 120, requesting the initiation of autonomous parking operations, requesting the initiation of autonomous summoning operations and requesting a stop of autonomous operations.

The STEER Auto Valet Manager Application 222 may also control the operations of a parking lot database manager for the first mobile communication device 120. The parking lot database manager may control a search HAV parking lots. For example, the parking lot database manager may request a search of the database 145 for HAV parking lots within a user defined area. Subsequently, the parking lot database manager may receive an indication corresponding to the number of HAV parking lots available within the user defined area.

It should be noted that the GPS data manager, the server manager and the parking lot database manager may each be implemented as a singleton class. A singleton class is a class that may only have one object at a time. However, this is merely provided for exemplary purposes and the GPS data manager, the server manager and the parking lot database manager may be executed based on any suitable programming construct.

It should be also noted that the functionality associated with the applications executed by the first mobile communication device 120 may be represented as a separate incorporated component of the first mobile communication device 120, e.g., an integrated circuit with or without firmware. For example, the integrated circuit may include input circuitry to receive signals and processing circuitry to process the signals and other information. In addition, in some mobile communication devices, the functionality described for the processor 220 is split among two processors, a baseband processor and an applications processor. The exemplary embodiments may be implemented in any of these or other suitable configurations of a mobile communication device.

The server 140 may include a processor 240, a memory arrangement 242 and a transceiver 244. The server 240 may be configured to facilitate communication between the first mobile communication device 120 and the automated vehicle system 115 of the vehicle 110. It should be noted that exemplary embodiments are described as being performed by the processor 240. However, other components may perform some or all of the functionalities described herein. The processor 240, the memory arrangement 242 and the transceiver 244 may be, for example, general purpose processors, a digital signal processor, an application specific integrated circuit (ASIAC), another type of integrated circuit and these processor and integrated circuits may execute software programs or firmware that perform functionality similar to the embodiments of the server 140 described herein. In some exemplary embodiments, the processor 240 may include multiple processors such as an application processor and a baseband processor.

The database 145 may be in communication with the server 140. The database 145 is configured to store HAV parking lot specific information (e.g. survey information, rules, policies, cost etc.) of all HAV parking lots. The database 145 may also be configured to store any information pertaining to a point of interest. The database 145 may utilize any suitable database structure for storing this data.

The server 140 may be configured to facilitate communication between the first mobile communication device 120 and the automated vehicle system 115 of the vehicle 110. The server 140 may operate according to Node.js and Socket.IO protocols. However, it should be noted that reference to Node.js and Socket.IO protocols is merely for illustrative purposes and the server 140 may utilize any type of framework and/or protocol to facilitate communication between the first mobile communication device 120 and the automated vehicle system 115 of the vehicle 110.

According to various exemplary embodiments, the server 140 may provide a secure connection between the first mobile communication device 120 and the automated vehicle system 115 by utilizing the room feature of the Socket.IO protocols. A room may limit the scope of events that may be listened to and emitted. Each room has a designated room key number and without the room key number, a further device cannot eavesdrop or highjack the events emitted inside the room. For instance, the STEER Auto Valet Manager Application 222 of the first mobile communication device 120 may establish a connection with the server 140 by joining a room. The corresponding room key number may be based on various credentials including, but not limited to, a particular IP address, a driver license number of the user, a STEER kit serial number or any other unique ID. The Auto Valet Manager 115 of the vehicle 110 may join the room by providing the same room key number. Once the first mobile communication device 120 and the automated vehicle system 115 join the room, communication between the first mobile communication device 120 and the automated vehicle system 115 of the vehicle 110 is confined to the room provided by the server 140. Accordingly, the entirety of the communication between the first mobile communication device 120 and the automated vehicle system 115 may occur over a secure socket connection provided by the room hosted by the server 140. It should be noted that reference to Socket.IO and a room is merely exemplary, and the exemplary embodiments may utilize any framework that provides a secure connection between the first mobile communication device 120 and the automated vehicle system 115.

Figure 3:
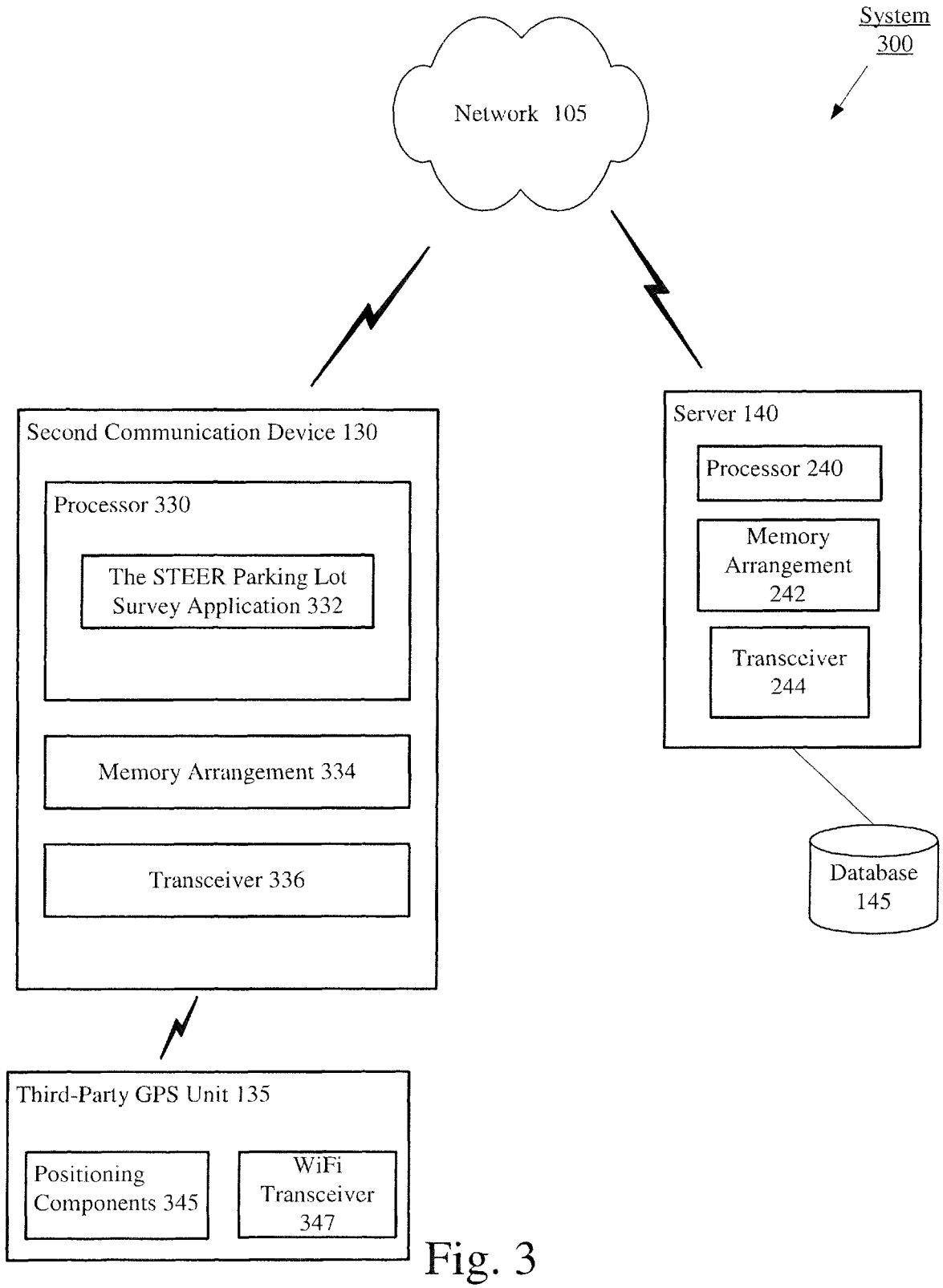
FIG. 3 shows an exemplary system enabled to provision a point of interest according to various exemplary embodiments described herein.

FIG. 3 shows an exemplary system 300 according to various exemplary embodiments. The system 300 includes the second mobile communication device 130, the third-party GPS unit 135, the server 140 and the database 145. The system 300 is configured to enable the provisioning of various points of interest. As mentioned above, a point of interest may represent a geographical area with defined boundaries and may include, but is not limited to, designated drop off locations, designated pick up locations, parking spots and parking lots. Upon surveying a parking lot within a point of interest, the conventional parking lot is converted to a HAV parking lot. An example of a point of interest may be a shopping mall, a train station, an airport, a campus, a restaurant, a consumer retail store or any other geographic area where a driver may want to exit their vehicle at first location and autonomously park their vehicle at a second location. It should be noted that surveying a point of interest and provisioning a point of interest may refer to the same process and the terms may be used interchangeably.

The third-party GPS unit 135 is configured to provide global positioning information in a highly accurate manner. The third-party GPS unit may be capable of real-time positioning information that is accurate within a predetermined threshold. Accordingly, the third-party GPS unit 135 may include various positioning components 345 that enable the collection of highly accurate positioning information. In one example, the various positioning components 345 may include components such as, but not limited to, various positioning sensors, a dual frequency receiver and an augmentation system. However, it should be noted that these components are merely provided for exemplary purposes and the third-party GPS unit 135 may include any suitable components that provide positioning information that is accurate within the predetermined threshold.

Further, the third-party GPS unit 135 may be configured to establish a connection with the second mobile communication device 130. This connection may be established via a WiFi transceiver 347. However, it should be noted that the WiFi transceiver 347 is merely provided for exemplary purposes and the third-party GPS unit 135 may be configured to establish any type of suitable connection with the second mobile communication device 130.

The second mobile communication device 130 may include a processor 330, a memory arrangement 334 and a transceiver 336. Further, the second mobile communication device 130 may include further components (not shown) such as a display device, an input/output device and other components such as portable power supply, an audio I/O device, etc.

The processor 330 may be configured to execute a plurality of applications of the second mobile communication device 130. For instance, the second mobile communication device 130 may execute the STEER Parking Lot Survey Application 332. The STEER Parking Lot Survey Application 332 may perform various functions, such as, establishing a connection between the third-party GPS unit 135 and the second mobile communication device 130, communicating with the third-party GPS unit 135, establishing a connection with the server 140, enabling the collection of information corresponding to a parking lot (e.g. provisioning a parking lot within a point of interest to create a HAV parking lot), etc. It should be noted that reference to the STEER Parking Lot Survey Application 332 is merely provided for illustrative purposes. Other systems may apply a different name to an application that performs the same functionality. Alternatively, the functionality of STEER Parking Lot Survey Application 332 may be distributed among a plurality of applications.

The STEER Parking Lot Survey Application 332 may also control the operations of a third-party GPS data manager of the second mobile communication device 130. The third-party GPS manager may control the interactions that occur between the second mobile communication device 130 and the third-party GPS unit 135. For example, the third-party GPS manager may establish the connection between the second mobile communication device 130 and the third-party GPS unit 135 via a WiFi link or any other suitable connection. Further, the third-party GPS manager may be configured to abstract the domain knowledge needed to control the operations of the third-party GPS unit 135 via the second mobile communication device 130. Additionally, the third-party GPS manager may be configured to determine accuracy of the third-party GPS unit 135 based on Real Time Kinematic (RTK) satellite navigation data.

The STEER Parking Lot Survey Application 332 may also control the operations of a server client manager of the second mobile communication device 130. The server client manager controls the communication between the STEER Parking Lot Survey Application 332 and the server 140. For example, the server client manager may provide functionality including, but not limited to, establishing a connection between the second mobile communication device 130 and the server 140, terminating a connection between the second mobile communication device 130 and the server 140 and uploading provisioning data corresponding to a point of interest to the server 140 to be stored on the database 145. As mentioned above, the server may communicate via the Socket.IO protocols. Thus, the server client manager may be configured to satisfy these protocols to communicate with the server 140. However, Socket.IO protocols are merely provided for exemplary purposes and the server client manager may communicate with server 140 via any suitable connection.

The STEER Parking Lot Survey Application 332 may also control the operations of a parking lot information collection manager of the second mobile communication device 130. The parking lot information collection manager may control operations associated with the provisioning of a point of interest. For example, the parking lot information collection manager may enable the second mobile communication device 130 record GPS waypoints for a path, record GPS waypoints for a geo-fence and package all the recorded waypoints in a data structure that may be uploaded to the server 140. In one example, the data structure may be in JSON format.

It should be noted that the functionality associated with the applications executed by the second mobile communication device 130 may be represented as a separate incorporated component of the second mobile communication device 130, e.g., an integrated circuit with or without firmware. For example, the integrated circuit may include input circuitry to receive signals and processing circuitry to process the signals and other information. In addition, in some mobile communication devices, the functionality described for the processor 330 is split among two processors, a baseband processor and an applications processor. The exemplary embodiments may be implemented in any of these or other suitable configurations of a mobile communication device.

As mentioned above, the server 140 may include a processor 240, a memory arrangement 242 and a transceiver 244. The server 140 may be configured to establish a connection with the second mobile communication device 130 and receive provisioning information corresponding to various points of interest. Subsequently, the server 140 may store the information received from the second mobile communication device 130 in the database 145.

The database 145 is in communication with the server 140. The database 145 is configured to point of interest specific information (e.g. surveying/provisioning information, rules, policies, cost, etc.) received from the second mobile communication device 130. The database 145 may utilize any suitable database structure for storing this data. However, it should be noted that the second mobile communication device 130 is not the only source that may provide provisioning information to the database 145. The exemplary embodiments may receive surveying information such as, but not limited to, positioning information corresponding to a point of interest from any source in addition to or instead of the second mobile communication device 130.

Figure 4:
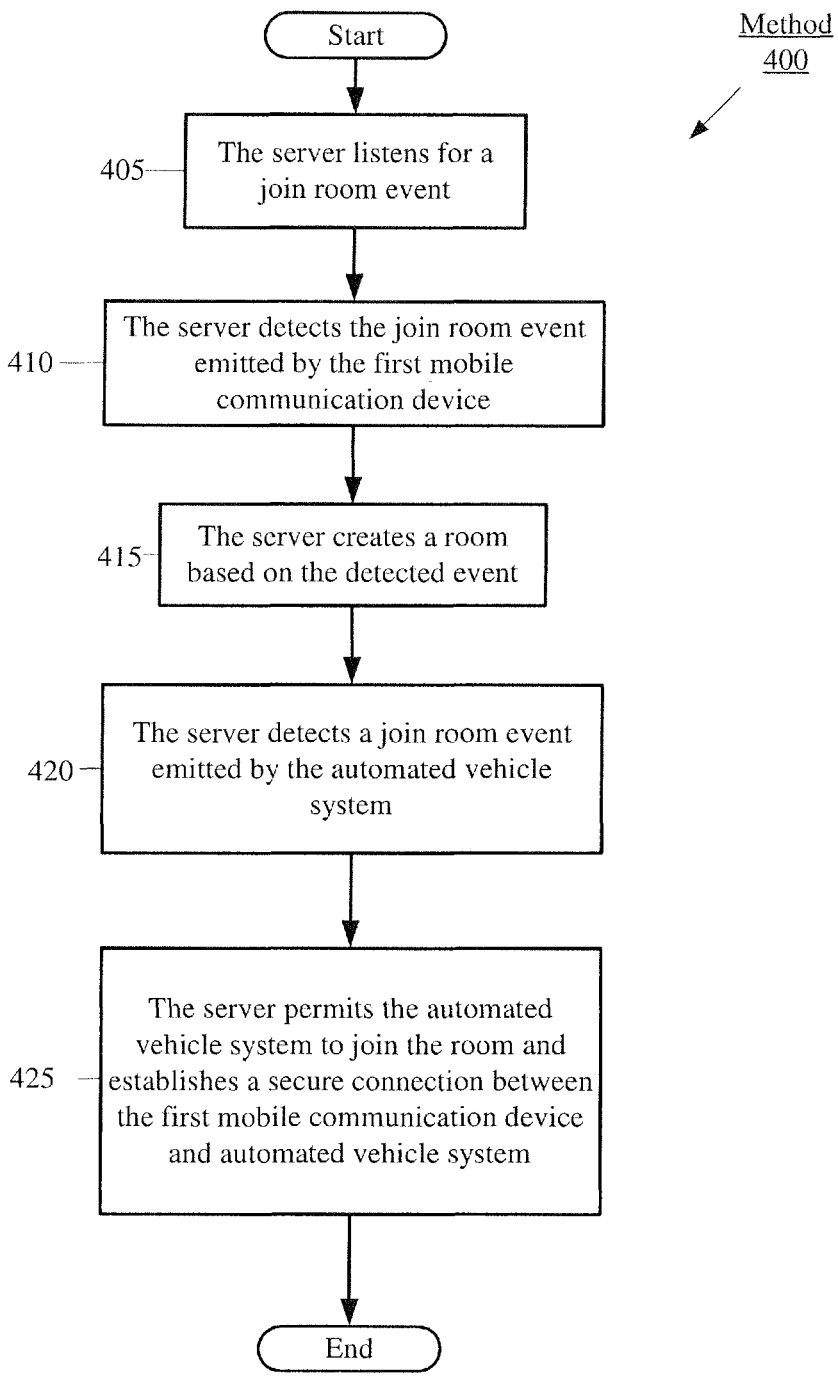
FIG. 4 shows an exemplary method 400 for establishing a communication channel between the first mobile communication device and the automatic vehicle system according to exemplary embodiments described herein.

FIG. 4 shows a method 400 for establishing a communication channel between the first mobile communication device 120 and the automatic vehicle system 115 of the vehicle 110. The method 400 may be performed by the first mobile communication device 120, the automatic vehicle system 115 of the vehicle 110 and the server 140. Thus, the method 400 will be described with regard to the system 200.

The system 200 may be based on an event driven model. That is, the first mobile communication device 120, the server 140, the database 145, and the automated vehicle system 115 of the vehicle 110 are configured to listen for a particular set of events. An event may be based on a format that includes a first portion and a second portion. The first portion of the event may identify the event name (e.g. join room, request vehicle state, request autonomous parking, etc.) and the second portion may comprise a data payload in JSON format or any other suitable format. It should be noted that the example of an event that includes a first portion and a second portion is merely for exemplary purposes and the event may be in any type of suitable format. In the example of a join room event, the data payload may be a unique identifying number that indicates to the server 140 that component making the request (e.g. the first mobile communication device 120 or the automated vehicle system 115 of the vehicle 110) is permitted to join the corresponding room. In response to a detected event from the particular set of events, a component of the system 200 may perform a predefined action locally and then subsequently, the component that performed the action may emit a further event. Thus, the method 400 may be based on an event driven model. However, it should be understood that the event driven model is merely for illustrative purposes and different systems may refer to similar communication techniques in a variety of manners. It should also be understood that the that the system 200 may utilize any suitable method In 405, the server 140 listens for a particular set of events. Specifically, the server 140 may be listening for a join room event emitted from the first mobile communication device 120 over a particular frequency or a particular channel. A room is part of the Socket.IO protocol and allows a secure socket connection to be established between any devices that join the room. It should be noted that reference to the Socket.IO protocol is merely provided for illustrative purposes and any type of protocol and/or framework that supports secure communication between devices may be utilized. Each room corresponds to a particular room key number and the room key number is required to create and join the room. The room key number may be based on a STEER serial number that corresponds to the STEER Auto Valet Manager application 222 of the first mobile communication device 120 and the STEER Auto Valet Manager 212 of the automated vehicle system 115. Alternatively, the room key number may be based on a unique ID of the user. In one exemplary embodiment, the unique ID of the user is based on the user's license number. However, it should be understood that the room key number may be based on any type of information. Thus, the first mobile communication device 120 may generate via the STEER Auto Valet Manager Application 222 a join room event in a format where the first portion of the event indicates that it is a join room event and the second portion of the event includes a data payload that may include a predetermined room key number or any type of information that provides an indication of a room key number. Subsequently, the transceiver 226 of the first mobile communication device 120 may emit the generated join room event.

In 410, the server 140 detects the join room event emitted by the first mobile communication device 120. The detection of the join room event may be based on control information received prior the reception of the join room event that indicates to the server 140 that the time and frequency at which the join room event will be emitted. Alternatively, the join room event may be detected based on a predetermined format or a predetermined indicator. However, it should be noted that the exemplary embodiments may detect the join room event in any suitable manner.

In 415, the server 140 creates a room based on the detected join room event. Creating the room may include permitting the first mobile communication device 120 to join the created room based on the detected join room event emitted by the first mobile communication device 120. As mentioned above, a room is part of the Socket.IO protocol.

In 420, the server 140 detects a join room event emitted by the automated vehicle system 115 of the vehicle 110. The detection of the join room event emitted by the automated vehicle system 1151 may be performed in the same manner as referenced above with regard to 410. The join room event emitted by the automated vehicle system 115 may include the same room key number or may provide another indication that the automated vehicle system 115 is permitted to join the room. It should be noted that method 400 does not require the join room event emitted by the first mobile communication device 120 be detected by the server 140 prior to detecting the join room event emitted by the automated vehicle system 115. The exemplary embodiments may apply to detecting the join room events in any order.

In 425, the server 140 permits the automated vehicle system 115 to join the room created in 415. Accordingly, a secure socket connection is created between the first mobile communication device 120 and the automated vehicle systems 115. A room may limit the scope of events that participants in the room (e.g. the first mobile communication device 120, the automated vehicle system 115 and the server 140) may be listening for or emitting. A further component or device will not be permitted to join the room without providing the corresponding room key number. Thus, without the room key number further components cannot eavesdrop of hijack subsequent events emitted in the room.

Once the secure socket connection is established between the first mobile communication device 120 and the automated vehicle system 115, further events may be emitted in the room by either the first mobile communication device 120 or the automated vehicle system 115 over the secure socket connection provided by the server 140.

Accordingly, the automated vehicle system 115 may be paired with STEER Auto Valet Manager Application 222 of the first mobile communication device 120. In one exemplary embodiment, the pairing may indicate that only the STEER Auto Valet Manager Application 222 is permitted to communicate with the automated vehicle system 115. This will serve as a security feature and prevent the STEER Auto Valet Manager Application 222 from interacting with other automated vehicle systems. Further, this may also prevent other applications from gaining control of the automated vehicle system 115.

FIG. 5 shows a method 500 for executing a search for HAV parking lots corresponding to provisioned points of interest within a user defined area. The method 500 will be performed by the first mobile communication device 120. Thus, the method 500 will be described with regard to the system 200. It should be noted that the method 500 may include an exchange of information between the first mobile communication device 120 and the server 140. The exchange of data between these components may be accomplished via the room of the Socket.IO protocol described above or any other suitable connection.

In 505, the first mobile communication device 120 receives input that indicates that a user has initiated a search for HAV parking lots corresponding to provisioned points of interest. Initiating a search may be based on physical input received from the user, audio input received from the user or any other suitable input.

In 510, the first mobile communication device 120 queries the server 140 for HAV parking lots corresponding to provisioned points of interest within a user defined range.

In 515, the first mobile communication device 120 receives from the server 140 HAV parking lots corresponding to provisioned points of interest within the user defined range. The STEER Auto Valet Manager Application 222 of the first mobile communication device 120 may then generate for display a list or any other suitable format to present the user with received HAV parking lots within the user defined range. The display may include various characteristics about the received HAV parking lots such as, but not limited to, a parking lot name, a distance from the first mobile communication device's 120 location, whether the parking lot offers surface, indoor, or garage parking, etc.

In 520, the first mobile communication device 120 determines whether it has received any input that indicates that the user has selected one of the displayed HAV parking lots. If after a predetermined duration the first mobile communication device 120 has not received any input that indicates a user has selected a particular HAV parking lot, the search routine described in 510 and 515 is repeated to ensure that the first mobile communication device 120 receives the most relevant information corresponding to the HAV parking lots within the user defined range. If the first mobile communication device 120 does receive input that indicates that the user has selected one of the displayed HAV parking lots the method continues to 525.

In 525, the parking lot ID of the selected HAV parking lot may be uploaded to the server 140 via any suitable type of connection. Further, selecting a particular HAV parking lot may cause a map to be displayed to the user via the first communication device 120. The map may include, in part, directions from the current location of the first mobile communication device 120 to the selected HAV parking lot. The map may also include a navigation option and a cancel option.

In 530 the first mobile communication device 120 determines whether input has been received that indicates to the first mobile communication device 120 that navigation option mentioned above has been selected. If the first mobile communication device 120 has received such an indication the method 500 continues to 530. If the user selects the cancel option or does not select either option, the method 500 ends.

In 535, the first mobile communication device 120 may initiate a map application of the first mobile communication device 120 (e.g. Google Maps, Apple Maps, Waze, etc.) with a destination preset of the selected HAV parking lot based on the indication that the navigation option presented in 530 has been selected.

Figure 5A:
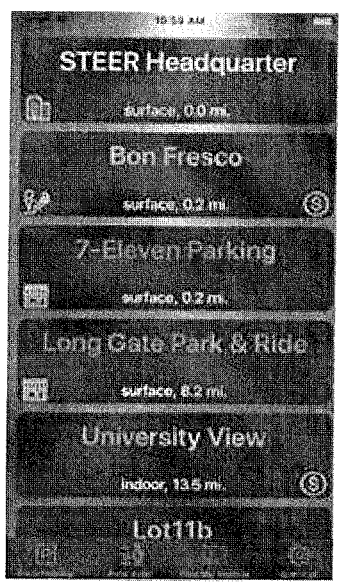
FIG. 5a-5b show an exemplary display provided to the user via the first mobile communication device during the execution of the method 500 according to exemplary embodiments described herein.
Figure 5B:

FIG. 5a-5b show an exemplary display provided to the user via the first mobile communication device 120 during the execution of the method 500. FIG. 5a shows an exemplary embodiment of the list of HAV parking lots that were determined to be within the user defined area. FIG. 5b shows an exemplary embodiment of the map displayed to the user via the first communication device 120 based on one of the HAV parking lots from the list shown in FIG. 5a being selected.

Figure 6:
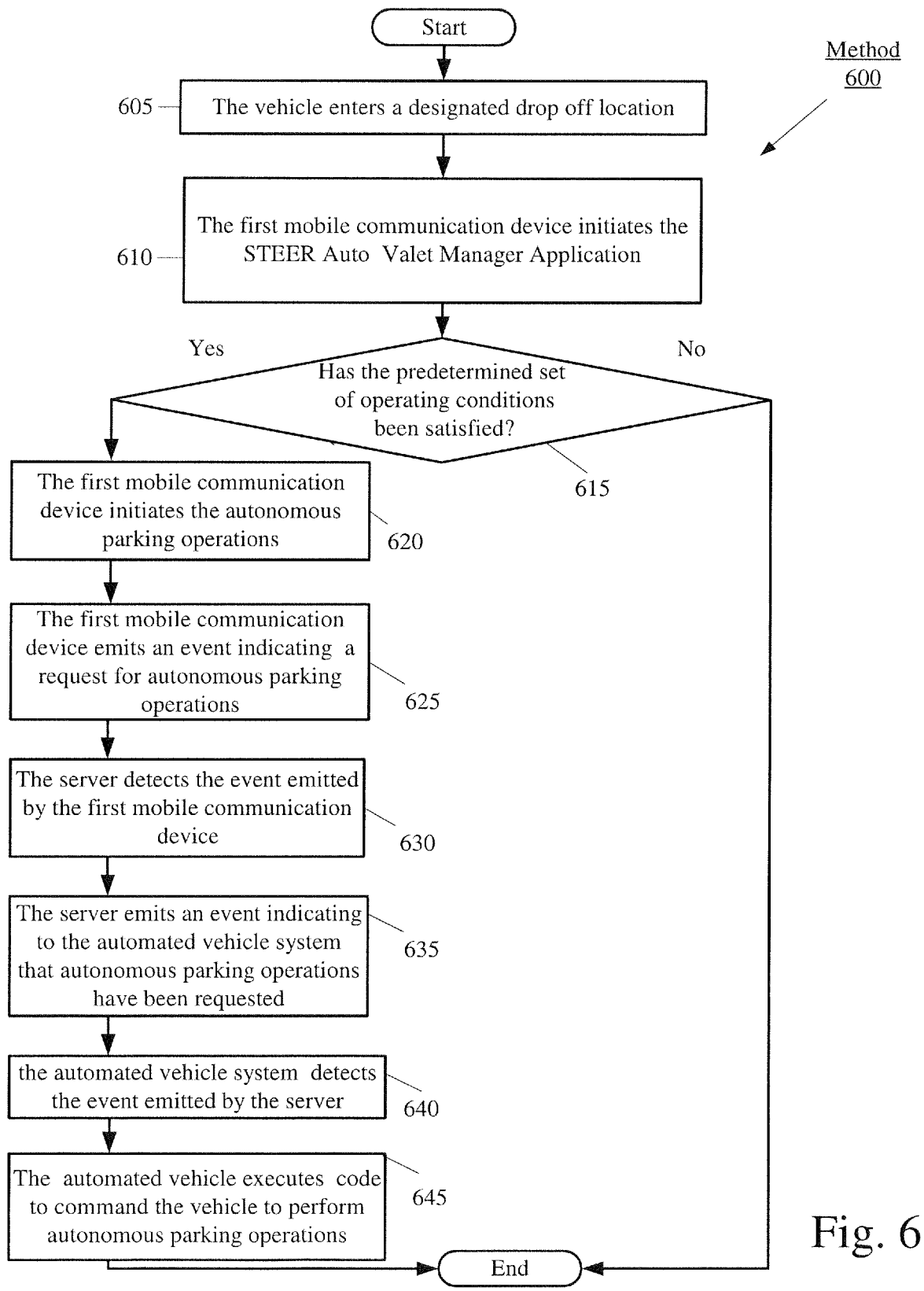
FIG. 6 shows an exemplary method 600 for executing autonomous parking by an autonomous vehicle according to exemplary embodiments described herein.

FIG. 6 shows a method 600 for executing autonomous parking operations by the vehicle 110. The method 600 will be performed by the first mobile communication device 120 and the automated vehicle system 115 of the vehicle 110. Thus, the method 600 will be described with regard to the system 200. It should be noted that the method 600 may include an exchange of information between the first mobile communication device 120 and the automated vehicle system 115 via the server 140. The exchange of data between these components may be accomplished via the room of the Socket.IO protocol referenced above in the method 400 or any other suitable connection. Thus, it should be noted that the method 600 is performed after the method 400 is performed and a room is established that facilitates communication between the first mobile communication device 120 and the automated vehicle system 115 of the vehicle 110.

Autonomous parking operation may include the vehicle 110 traveling from a first location (e.g. a designated drop off location or a parking space) to a second location (e.g. a designated pick up location or a packing space) without any human interaction during the trip. For example, the vehicle 110 may perform all safety critical driving functions and monitor roadway conditions for the duration of a trip between the first location and the second location. In one exemplary embodiment, the second location is a parking spot located within a corresponding HAV parking lot corresponding to a provisioned point of interest. The particular parking spot may be chosen by the user via the first mobile communication device 120. Alternatively, the automated vehicle system 115 may be capable of traveling to an area designated as a HAV parking lot, search for available parking spot within the corresponding HAV parking lot and subsequently, navigate into the available parking spot and park itself.

In 605, the vehicle 110 enters a designated drop off location within a provisioned point of interest. The designate drop off location serves as a first location for the vehicle 110. For example, the user may drive the vehicle 110 to an airport (e.g. a provisioned point of interest) that has a designated drop off location and a HAV parking lot.

In 610, the user may interact with the first mobile communication device 120 and indicate to the STEER Auto Valet Manager Application 222 that the user would like to initiate the autonomous parking operation of the automated vehicle system 115. As mentioned above, it is assumed that the first mobile communication device 120 and the automated vehicle system 115 of the vehicle 110 have already established a secure socket connection via the room of the Socket.IO protocol described above with regard to the method 400. This secure socket connection may be established prior to the car entering the designated drop off location, after the user exits the vehicle 110 at the designated drop off location or at any other moment prior to autonomous parking operations being initiated by the user via the first communication device 120.

In 615, the STEER Auto Valet Manager Application 222 may determine whether a predetermined set of operating conditions are satisfied before the user is able to initiate the autonomous parking operation of the vehicle 110. The predetermined set of operation conditions (e.g. policy) may include determining whether the vehicle 110 is capable of entering autonomous mode. This may include, but is not limited to, determining whether a secure connection (e.g. a room) has been established between the first mobile communication device 120 and the automated vehicle system 115 of the vehicle 110. The predetermined operating conditions may further include, determining whether the headlights of the vehicle 110 are set to automatic mode, determining whether the window wiper blade is set to automatic mode, determining whether the vehicle 110 is occupied, determining whether the vehicle 110 is currently located in a point of interest, and determining whether the fuel tank contains a predetermined amount of fuel. These determinations may be based on responses to requests made by the first mobile communication device 120 to the automated vehicle system 115 for vehicle state information and vehicle location information. Vehicle state information may be any information that may indicate to the first mobile communication device 120 current operating conditions of the vehicle 110 that correspond to the predetermined operating conditions. After the secure socket connection has been established, requests for vehicle state information may be made periodically to ensure that the first mobile communication device 120 has received the current operating conditions for the vehicle 110. The method of requesting vehicle state information will be described below with regard to FIG. 7. If the STEER Auto Valet Manager Application 222 determines that the predetermined operating conditions have been satisfied the method 600 continues to 620.

However, if the STEER Auto Valet Manager Application 222 determines that the predetermined operating conditions are not satisfied the method 600 ends because the autonomous parking operation of the vehicle 110 is not permitted. Alternatively, the user is permitted to attempt to satisfy the predetermined operating conditions and repeat 615. The predetermined operating conditions serve as a security feature and ensure that autonomous operations are only permitted according to the conditions set out in the ODD of the vehicle 110.

In 620, the first mobile communication device 120 receives input that initiates the autonomous parking operation of the vehicle 110 is to be initiated. For example, after the predetermined conditions are met the STEER Auto Valet Manager Application 222 may display a button or option to the user via the first communication device 120 that enables the user to initiate the autonomous parking operation of the vehicle 110. In another exemplary embodiment, instead of a button the user is presented with prompt for one of voice verification, finger print verification or facial ID verification. It should be understood that the STEER Auto Valet Manager Application 222 may permit the user to initiate the autonomous parking operation of the vehicle 110 via a combination of any of the inputs described above or in any other suitable type of input corresponding to the first communication device 120.

In 625, the first mobile communication device 120 emits to the room an event indicating that the autonomous parking operation of the vehicle 110 has been requested.

In 630, the server 140 detects the event emitted by the first mobile communication device 120 to the room. The detection of the event may be based on the server listening for a particular set of events, a particular event format, a particular type of event or a combination thereof.

In 635, the server 140 emits an event indicating to the automated vehicle system 115 that the STEER Auto Valet Manager Application 222 of the first mobile communication device 120 is requesting that the vehicle perform autonomous parking operation.

In 640, the automated vehicle system 115 detects the event emitted by the server 140. The detection of the event may be based on the automated vehicle system 115 listening for a particular set of events, a particular event format, a particular type of event or a combination thereof.

In 645, the automated vehicle system 115 executes code to command the vehicle 110 to perform the autonomous parking operation. For example, the server client 214 of the Auto Valet Manager 212 may invoke a particular callback function in response to the detected event. Subsequently, the vehicle communication client 216 may implement the communication protocol specific to the vehicle command and communication channel. The vehicle control center may control the autonomous operations of the vehicle (e.g. all the safety critical driving functions and monitor roadway conditions for the duration of the trip) based on the information received via the vehicle command and communication channel. Thus, vehicle 110 may travel from a first location (e.g. a designated drop off location) within the point of interest and to a second location within the point of interest and park in an available parking space of an HAV parking lot located within the point of interest without any human interaction during the trip.

Figure 7:
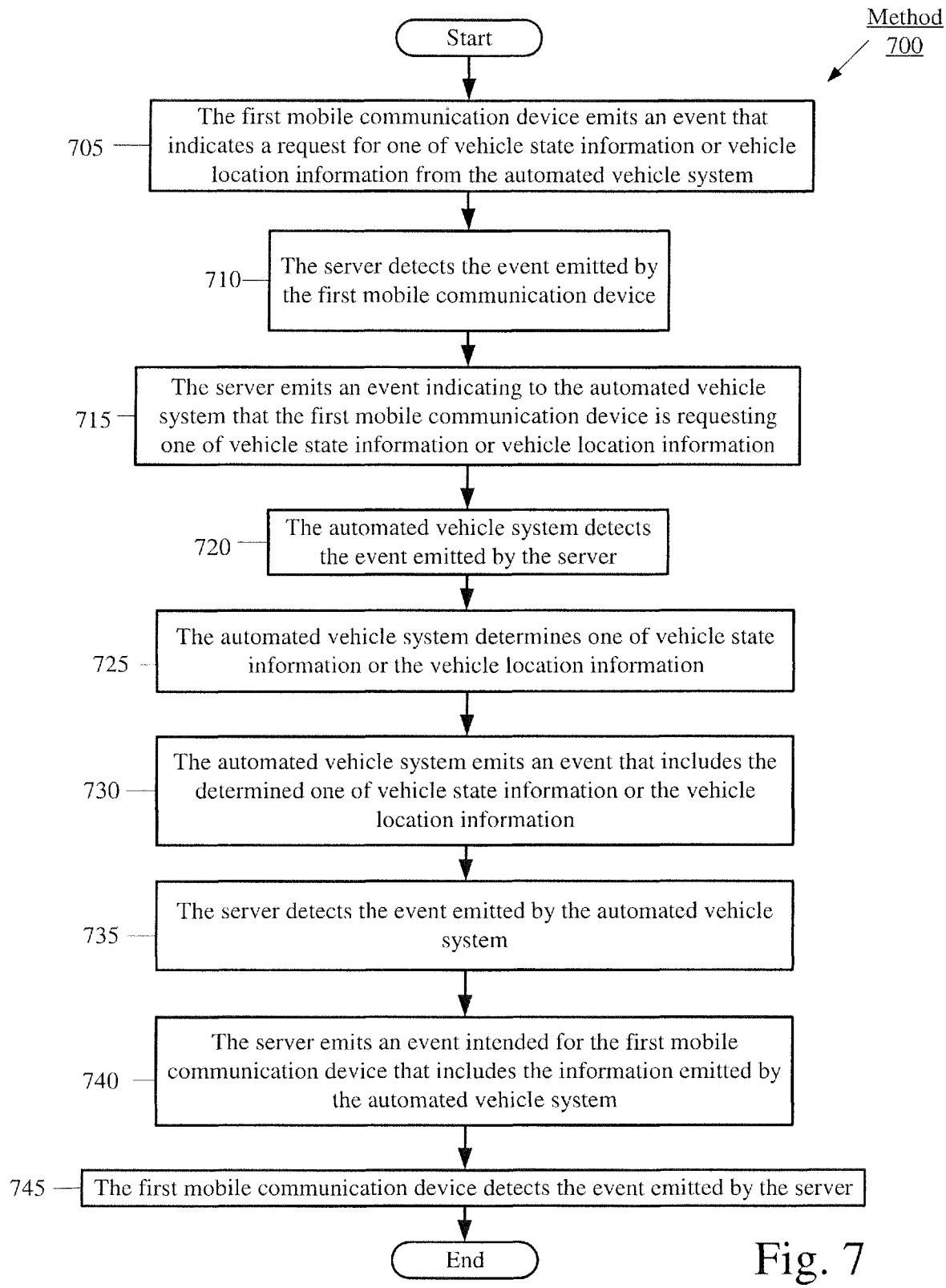
FIG. 7 shows an exemplary method 700 for requesting vehicle state information and vehicle location information according to exemplary embodiments described herein.

FIG. 7 shows a method 700 for requesting by the first mobile communication device 120 from the vehicle 110, vehicle state information and vehicle location information according to various exemplary embodiments. As mentioned above, the method 600 may utilize vehicle state data and/or vehicle location data to perform various determinations. Thus, the method 700 may occur during or before the execution of the method 600. However, it should be noted that vehicle state information and/or vehicle location information may be utilized for a variety of purposes and thus, the first mobile communication device 120 may request these types of data periodically at predetermined intervals or based on a user request. Further, similar to the method 600, the method 700 occurs after a room of the Socket.IO protocol is established by the server 120 that facilitates communication between the first mobile communication device 120 and the automated vehicle system 115 of the vehicle 110. Accordingly, FIG. 7 is described with reference to the system 200.

In 705, at a particular time the first mobile communication device emits to the room a request for at least one of vehicle state information or vehicle location information. The request may be initiated based on input from the user, input from a further device, a predetermined interval or a combination thereof. As mentioned above, an event may be emitted in any suitable format that satisfies the particular protocol implemented by the server 140 in establishing the room or any other type of secure connection between the first mobile communication device 120 and the automated vehicle system 115.

In 710, the server 140 detects the event emitted by the first communication device 120. The detection of the event may be based on the server 140 listening for a particular set of events, a particular event format, a particular type of event or a combination thereof.

In 715, the server 140 emits an event indicating to the automated vehicle system 115 that the STEER Auto Valet Manager Application 222 of the first mobile communication device 120 is requesting vehicle state information and/or vehicle location information.

In 720, the automated vehicle system 115 detects the event emitted by the server 140. The detection of the event may be based on the automated vehicle system 115 listening for a particular set of events, a particular event format, a particular type of event or a combination thereof.

In 725, the automated vehicle system 115 determines the vehicle state and/or the vehicle location based on the event detected in 720. For example, in one exemplary embodiment, the automated vehicle system 115 requests the necessary information from the various systems and components of the vehicle 110 in response to the reception of the corresponding event. In an alternative exemplary embodiment, the automated vehicle system 115 periodically receives the vehicle state information and the vehicle location information from the corresponding systems and components of the vehicle 110 at periodic intervals or whenever either the vehicle state information or the vehicle location information changes. The automated vehicle system 115 may store this information on a buffer and in response to the detected event, the automated vehicle system 115 may read this information off the buffer.

In 730, the automated vehicle system 115 emits an event that includes the information determined in 725. For example, once the requested information is compiled (e.g. vehicle state information or vehicle location) or determined to be available via the buffer the automated vehicle system 115 generates for transmission an event. This event may include a first portion that may indicate that the event contains vehicle state information and/or vehicle location information and the second portion of the event may include the data payload that indicates the actual vehicle state information and/or vehicle location information of the vehicle 110.

In 735, the server 140 detects the event emitted by the automated vehicles system 115. The detection of the event may be based on the server 140 listening for a particular set of events, a particular event format, a particular type of event or a combination thereof.

In 740, the server 140 emits an event intended for the first mobile communication device 120 including at least an indication of the requested vehicle state information and/or vehicle based on the event detected by the server 140 in 735.

In 745, the STEER Auto Valet Manager Application 222 of the first mobile communication device 120 may detect the event emitted by the server in 740. The detection of the event may be based on the STEER Auto Valet Manager Application 222 listening for a particular set of events, a particular event format, a particular type of event or a combination thereof. Subsequently, the STEER Auto Valet Manager Application 222 stores the updated vehicle state information and/or vehicle location information.

Figure 8:
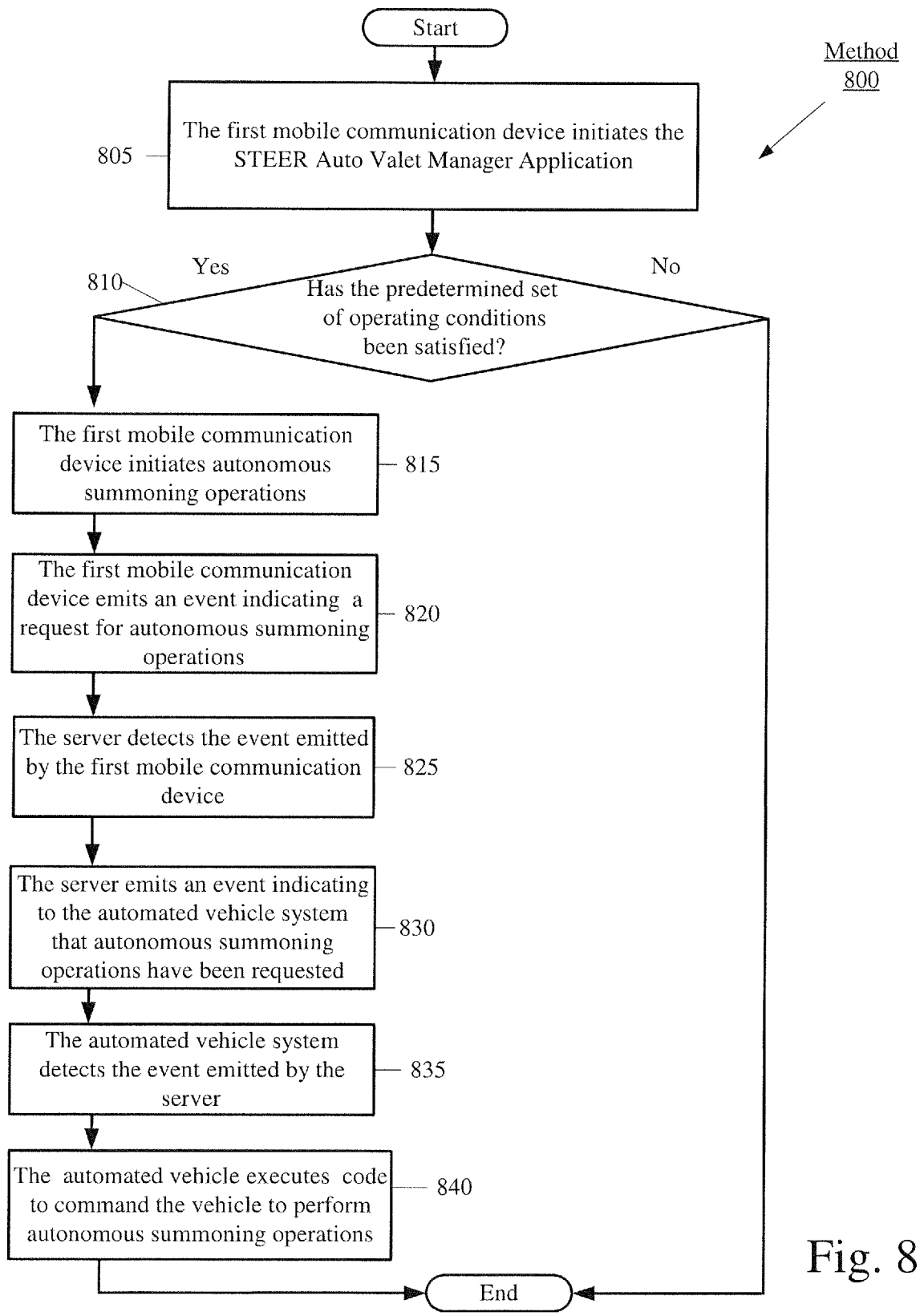
FIG. 8 shows an exemplary method 800 for executing autonomous summoning of an autonomous vehicle according to exemplary embodiments described herein.

FIG. 8 shows a method 800 for executing autonomous summoning operations of the vehicle 110. The method 800 will be performed by the first mobile communication device 120 and the automated vehicle system 115 of the vehicle 110. Thus, the method 800 will be described with regard to the system 200. It should be noted that the method 800 may include an exchange of information between the first mobile communication device 120 and automated vehicle system 115 of the vehicle 110 via the server 140. The exchange of data between these components may be accomplished via the room of the Socket.IO protocol referenced in the method 400 or any other suitable connection. Thus, it should be noted that the method 800 is performed after the method 400 is performed and a room is established that facilitates communication between the first mobile communication device 120 and the automated vehicle system 115 of the vehicle 110.

It should be noted that the autonomous summoning operations, similar to the autonomous parking operations, may include the vehicle 110 traveling from one location to another location without any human interaction during the trip. It should be further noted that the method 800 may be performed after the method 600. For instance, in the method 600 the vehicle 110 is autonomously parked in a parking space of a HAV parking lot corresponding to a provisioned point of interest. The autonomous summoning operations may be utilized to request that the car autonomously navigate from the parking spot the vehicle 110 navigated to in the method 600 to a designated pick up location located within the corresponding point of interest. However, the method 800 may be performed independently of the method 600.

In 805, the user may interact with the first mobile communication device 120 and indicate to the STEER Auto Valet Manager Application 222 that the user would like to initiate the autonomous summoning operation of the automated vehicle system 115. For example, after executing the method 600, the user may return to the airport after leaving the vehicle 110 at the parking spot in the HAV parking lot the vehicle 110 autonomously navigated to in the method 600. At the airport (e.g. point of interest), the user may summon the car to autonomously navigate from its current location to a designated pick up location within the point of interest.

As mentioned above, it is assumed that the first mobile communication device 120 and the automated vehicle system 115 of the vehicle 110 have already established a secure socket connection via the room of the Socket.IO protocol described above with regard to the method 400. This secure socket connection may be established at any time prior to user requesting the vehicle 110 autonomously navigate to the designated pick up location. It should be noted that between the execution of the method 600 and the method 800 the first mobile communication device 120 and the automated vehicle system 115 may establish a secure connection and terminate the corresponding secure connection a plurality of times or may maintain the same secure connection for the duration between the execution of the method 600 and the method 800.

In 810, the STEER Auto Valet Manager Application 222 may determine whether a predetermined set of operating conditions are satisfied before the user is able to initiate the autonomous summoning operation of the vehicle 110. The predetermined set of operating conditions may be the same predetermined set of operation conditions described above in 615. In an alternative embodiment, the predetermined set of operating conditions may include a different number of operating conditions than the set of operating conditions described above in 615. If the STEER Auto Valet Manager Application 222 determines that the predetermined operating conditions have been satisfied the method continues to 815.

However, if the STEER Auto Valet Manager Application 222 determines that the predetermined operating conditions are not satisfied the method 800 ends because the autonomous parking operation of the vehicle 110 is not permitted. Alternatively, the user is permitted to attempt to satisfy the predetermined operating conditions and repeat 810. The predetermined operating conditions serve as a security feature and ensure that autonomous operations are limited according to the ODD of the vehicle 110.

In 815, the first mobile communication device 120 receives input that initiates the autonomous summoning operation of the vehicle 110. For example, after the predetermined conditions are met the STEER Auto Valet Manager Application 222 may present a button or option to the user that enables the user to initiate the autonomous summoning operation of the vehicle 110. In another exemplary embodiment, instead of a button the user is presented with a prompt for one of voice verification, finger print verification or facial ID verification. It should be understood that the STEER Auto Valet Manager Application 222 may permit the user to initiate the autonomous parking operation of the vehicle 110 via a combination of any of the inputs described above or in any other suitable type of input corresponding to the first communication device 120.

In 820, the first mobile communication device 120 emits to the room an event indicating that the user has requested to initiate the autonomous summoning operation of the vehicle 110.

In 825, the server 140 detects the event emitted by the first mobile communication device 120. The detection of the event may be based on server 140 listening for a particular set of events, a particular event format, a particular type of event or a combination thereof.

In 830, the server 140 emits an event indicating to the automated vehicle system 115 that the STEER Auto Valet Manager Application 222 of the first mobile communication device 120 is requesting that the vehicle perform autonomous summoning operation.

In 835, the automated vehicle system 115 detects the event emitted by the server 140. The detection of the event may be based on the automated vehicle system 115 listening for a particular set of events, a particular event format, a particular type of event or a combination thereof.

In 840, the automated vehicle system 115 executes code to command the vehicle 110 to perform the autonomous summoning operation. For example, the server client 214 of the Auto Valet Manager 212 may invoke a particular callback function in response to the detected event. Subsequently, the vehicle communication client 216 may implement the communication protocol specific to the vehicle command and communication channel. The vehicle control center may then execute code to control the autonomous summoning operations of the vehicle 110 which enables the vehicle 110 to travel between a first location (e.g. parking spot in the HAV parking lot of the provisioned point of interest) and a second location (e.g. a designated pick up location corresponding to the provisioned point of interest) without any human interaction during the trip.

Figure 9:
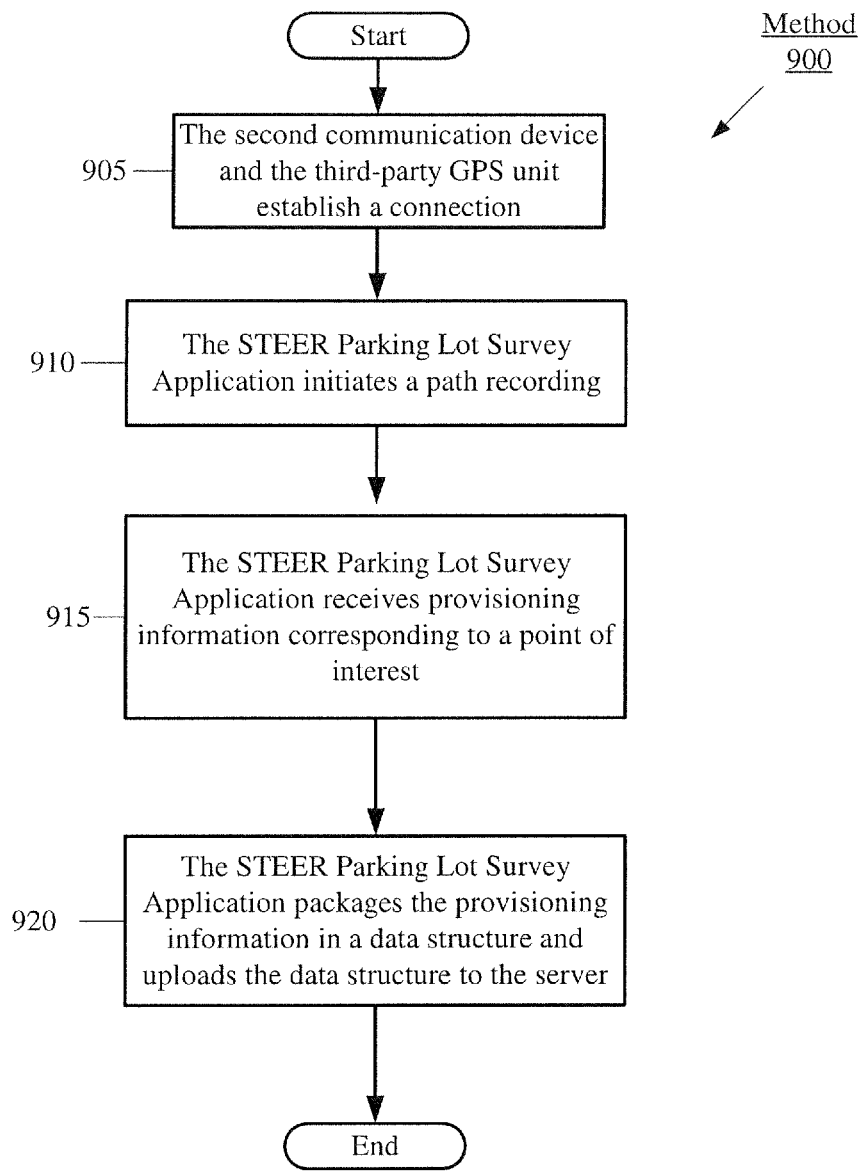
FIG. 9 shows exemplary method 900 for provisioning a point of interest according to various embodiments described herein.

FIG. 9 shows a method 900 for provisioning point of interest information according to various exemplary embodiments. The method 900 will be performed by the second mobile communication device 130, a third-party GPS unit 135, the server 140 and the database 145. Thus, the method 900 will be described with regard to the system 300. It should be noted that the method 900 may include an exchange of information between the second mobile communication device 230 and the server 140. The exchange of data between these components may be accomplished via the room of the Socket.IO protocol described above or any other suitable connection.

A point of interest may represent a geographical area with defined boundaries and may include, but is not limited to, designated drop off locations, designated pick up locations, parking spots and parking lots. An example of a point of interest may be a shopping mall, a train station, an airport, a campus, a restaurant, a consumer retail store or any other geographic area where a driver may want to exit their vehicle at first location and autonomously park their vehicle at a second location.

Accordingly, the method 900 may convert a conventional parking lot into a HAV parking lot corresponding to a provisioned point of interest. For instance, in one exemplary scenario, the server 140 may send a surveying assignment to the STEER Parking Lot Survey Application 332. The surveying assignment may include indications corresponding to paths that are to be surveyed, areas that may be used for HAV parking or any other type of instructions regarding provisioning the point of interest. Subsequently, a user equipped with the second mobile communication device 130 and the third-party GPS unit 135 may be able to control the collection of the provisioning/surveying information needed to provision the point of interest.

In 905, the second communication device 130 and the third-party GPS unit 135 may establish a connection. In one example, the connection between the second communication device 130 and the third-party GPS unit 135. The connection may enable the STEER Parking Lot Survey Application 332 of the second communication device 130 to abstract the domain knowledge needed to control the operations of the third-party GPS unit 135.

In 910, the second communication device 130 may receive input indicting that the user of the second communication device 130 has initiated a path recording via the STEER Parking Lot Survey Application 332. A path recording enables the collection of the information required to provision a point of interest. This information may include, but is not limited to, latitude, longitude, altitude, data corresponding to a representation of objects within the point of interest, etc. For example, the information may include data corresponding to a three-dimensional representation of a road sign within the point of interest that was captured during the path recording.

In 915, the STEER Parking Lot Survey Application 332 receives the provisioning information corresponding to a point of interest based on the execution of the path recording. This information may include positioning information related to drivable paths located within the point of interest, drivable areas located within the point of interest, the locations of parking spots within the point of interest, and any other type of information describing the point of interest that may be utilized by the automated vehicle system 115 of the vehicle 110 to autonomously navigate within the point of interest. Further, the STEER Parking Lot Survey Application 332 automates various manual tasks that traditionally require a professional land surveyor, including, but not limited to, setting up GPS unit setting, GPS unit data logging and generating results with high quality assurance.

The provisioning information may include positioning information received via the third-party GPS unit 135. The third-party GPS unit 135 is utilized because it is capable of providing positioning information that satisfies a predetermined threshold that is typically not capable of being satisfied by conventional GPS units included in conventional mobile communication devices. However, the exemplary embodiments may apply to any GPS unit, external or internal to the second mobile communication device 130, that satisfies the predetermined threshold.

Further, the STEER Parking Lot Survey Application 332 enables the user to ensure the accuracy of the GPS information received from the third-party GPS unit 135. The user may ensure the accuracy in a variety of different ways. For example, the user may be physically located at the point of interest and may be able to visually compare the GPS information displayed via the STEER Parking Lot Survey Application 332 to their corresponding real-world locations. In another exemplary embodiment, the user may ensure the accuracy of the third-party GPS unit 135 based on Real Time Kinematic (RTK) satellite navigation data available via the STEER Parking Lot Survey Application 332.

The STEER Parking Lot Survey Application 332 may also enable the user of the second communication device 130 to record various GPS waypoints for a path and record GPS waypoints for a geo-fence. Further, the user may be able to tag the recorded waypoints with various sign icons during the path recording.

In 920, the STEER Parking Lot Survey Application 332 may package some or all of the provisioning information received during the path recording in a data structure that may be uploaded to the server 140. For example, the data structure may be in JSON format or any other suitable type of data structure that enables the STEER Parking Lot Survey Application 332 to upload the provisioning information corresponding to a point of interest to the server 140. It should be noted that the STEER Parking Lot Survey Application 332 may reject uploads if they do not satisfy predetermined quality assurance threshold.

FIG. 9a-9b shows an exemplary display provided to the user via the second mobile communication device 130 during the execution of the method 900. FIG. 9a shows an exemplary embodiment of a user interface that enables the user to record way points and tag the recorded waypoints with various road signs during a path recording. FIG. 9b shows an exemplary embodiment of a display that enables a user to access previous path recordings.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claim is:

1. A method, comprising:
   at a mobile communication device:
   establishing a connection with an autonomous vehicle, wherein establishing the connection with the autonomous vehicle comprises establishing a secure connection between the mobile communication device and the autonomous vehicle utilizing a room feature, and wherein the autonomous vehicle possesses a room key that allows access to the room feature;
   establishing a connection with a second mobile communication device wherein:
   the second mobile communication device receives data corresponding to at least a point of interest; and
   the second mobile communication device communicates with a Global Positioning System (GPS);
   ensuring that the autonomous vehicle is within a required operational design domain (ODD) when performing autonomous operations, wherein required ODD is a function of an automated system of the autonomous vehicle, and ensuring that the autonomous vehicle is within the ODD further comprises:
   detecting, using the GPS, whether the autonomous vehicle is within a geo-fence boundary defining the ODD; and
   enabling the autonomous vehicle to perform autonomous operations if the autonomous vehicle is within the geo-fence boundary; and
   initiating a mission for the autonomous vehicle, wherein the mission comprises a plurality of autonomous operations, the plurality of autonomous operations including a first operation comprising at least a first autonomous trip, wherein:
   the first autonomous trip includes the autonomous vehicle traveling from a first location to a second location via a pre-provisioned route without operator input and wherein:
   the plurality of autonomous operations further comprises a second operation within one of the first or second locations, and wherein:
   the autonomous vehicle performs the mission.

2. The method of claim 1, further comprising:
   at the mobile communication device:
   receiving vehicle state information corresponding to the autonomous vehicle; and
   determining whether the vehicle state information satisfies predetermined conditions, wherein the initiating the mission is permitted based on the vehicle state information satisfying the predetermined conditions.

3. The method of claim 1, wherein initiating the mission is permitted based on the autonomous vehicle being located in the first location.

4. The method of claim 1, wherein the second location is a parking lot.

5. The method of claim 4, wherein the parking lot is comprised of a plurality of parking spots and wherein the second operation comprises identifying an available parking spot from the plurality of parking spots.

6. The method of claim 4, wherein the second operation comprises parking the autonomous vehicle.

7. The method of claim 1, wherein the connection between the mobile communication device and the autonomous vehicle is a secure socket connection.

8. The method of claim 1, wherein the first location is a parking lot.

9. The method of claim 1, further comprising:
   at the mobile communication device:
   after the autonomous vehicle has performed the mission, initiating a further mission comprising a further plurality of autonomous operations, the further plurality of autonomous operations including a first operation comprising at least a second autonomous trip, wherein the second autonomous trip includes the autonomous vehicle traveling from the second location to one of the first location or a third location via a pre-provisioned route without operator input and wherein the plurality of autonomous operations further comprises a second operation within any of the locations.

10. A method, comprising:
    at a processor of an autonomous vehicle:
    establishing a connection with an autonomous vehicle, wherein establishing the connection with the autonomous vehicle comprises establishing a secure connection between a mobile communication device and the autonomous vehicle utilizing a room feature, and wherein the autonomous vehicle possesses a room key that allows access to the room feature;
    establishing a connection with a second mobile communication device wherein:
    the second mobile communication device receives data corresponding to at least a point of interest; and
    the second mobile communication device communicates with a Global Positioning System (GPS);

ensuring that the autonomous vehicle is within a required operational design domain (ODD) when performing autonomous operations, wherein the required ODD is a function of an automated system of the autonomous vehicle, and ensuring that the autonomous vehicle is within the ODD further comprises:
  detecting, using the GPS, whether the autonomous vehicle is within a geo-fence boundary defining the ODD; and
  enabling the autonomous vehicle to perform autonomous operations if the autonomous vehicle is within the geo-fence boundary;
receiving a request to initiate a mission for the autonomous vehicle, wherein the mission comprises a plurality of autonomous operations, the plurality of autonomous operations including a first operation comprising at least a first autonomous trip, wherein the first autonomous trip includes the autonomous vehicle traveling from a first location to a second location via a pre-provisioned route without operator input and, wherein the plurality of autonomous operations further comprises a second operation within one of the first or second locations; and
initiating the mission based on the request.

11. The method of claim 10, further comprising:
at the processor of an autonomous vehicle:
receiving vehicle state information corresponding to the autonomous vehicle; and
transmitting the vehicle state information to the mobile communication device.

12. The method of claim 10, wherein the second location is a parking lot.

13. The method of claim 12, wherein the parking lot is comprised of a plurality of parking spots and wherein the second operation comprises identifying an available parking spot from the plurality of parking spots.

14. The method of claim 10, wherein the autonomous vehicle is unoccupied during the first autonomous trip.

15. The method of claim 10, wherein the first location is a parking lot.

16. The method of claim 10, further comprising:
  at the processor of the autonomous vehicle:
    after the autonomous vehicle has performed the mission, receiving a further request to initiate a further mission comprising a further plurality of autonomous operations, the further plurality of autonomous operations including a first operation comprising at least a second autonomous trip, wherein the second autonomous trip includes the autonomous vehicle traveling from the second location to one of the first location or a third location via a pre-provisioned route without operation input and wherein the plurality of autonomous operations further comprises a second operation within any of the locations.

17. The method of claim 10, the operations further comprising:
  after the connection with the mobile communication device is established, receiving periodic requests for the vehicle state information from the mobile communication device.

* * * * *